April 26, 1966     D. C. WYCOFF     3,248,625

ELECTRIC MOTOR CONTROL SYSTEM

Filed April 23, 1962     7 Sheets-Sheet 1

INVENTOR
DAVID C. WYCOFF
BY

April 26, 1966          D. C. WYCOFF          3,248,625

ELECTRIC MOTOR CONTROL SYSTEM

Filed April 23, 1962          7 Sheets-Sheet 4

INVENTOR
DAVID C. WYCOFF
BY
ATTORNEY

April 26, 1966 D. C. WYCOFF 3,248,625
ELECTRIC MOTOR CONTROL SYSTEM
Filed April 23, 1962 7 Sheets-Sheet 7

INVENTOR
DAVID C. WYCOFF
BY
ATTORNEY

United States Patent Office 3,248,625
Patented Apr. 26, 1966

3,248,625
ELECTRIC MOTOR CONTROL SYSTEM
David C. Wycoff, Brookfield, Wis., assignor to Harnischfeger Corporation, Milwaukee, Wis.
Filed Apr. 23, 1962, Ser. No. 189,586
11 Claims. (Cl. 318—203)

This invention relates to a speed control system for electric motors and is especially, although not necessarily exclusively, concerned with the control of drive motors of cranes and other material-handling machinery. It is related to, and from certain aspects may be regarded as an improvement upon, the invention of application Serial No. 591,683 of Frank W. Wendelburg et al., filed June 15, 1956, which is owned by the assignee of the present invention.

One system embodying the invention comprises a static stepless control in which two electrically energizable control elements are employed, one for increasing the motor torque when the speed is less than that required and one adapted to develop a torque opposing rotation of the motor when the speed is greater than that required, in combination with means for maintaining desired speed by variably energizing one or the other of such elements as conditions require.

In the preferred form of such embodiment of the invention, the first of said elements comprises a saturable reactor and the second comprises electro-responsive braking means. (In crane hoist work the latter element is known as an electric load brake and the two terms are sometimes used herein interchangeably to refer to any suitable electro-responsive braking means.) When the drive is running at less than the desired speed, the saturable reactor is energized and the brake is not. If the drive is running faster than the desired speed the reactor is not energized, reducing the motor torque to a minimum, and the electric load brake is energized to hold the desired speed. Under steady state conditions the reactor and brake are never energized simultaneously. This results in efficient operation of the motor under all conditions.

An important object of the invention is to provide for a variable speed range of the motor and speed regulation to maintain a given speed in the presence of varying loads, even those which overhaul the motor.

A further object is to provide in such a system means whereby full speed control with an overhauling load is maintained without resorting to relatively inefficient motor countertorque means such as have been used in certain prior systems.

Another object is to provide for speed control through the use of two electrically energizable control elements (as mentioned above), operating in such manner that one thereof controls motor torque between minimum and maximum values and the other thereof is capable of developing retarding torque which is also variable between minimum and maximum values.

It is also an object of the invention to provide for control of these elements in such a way as to obtain increased efficiency of operation by eliminating overlap of functions between the element which controls motor torque and the one which produces retarding torque.

Since elimination of overlap between the control elements results in a more stable system, a high degree of sensitivity (amplifier gain) can be used, thus reducing speed variations with load changes, and in this manner provision is made for improved speed regulations.

It is a further object of the invention to provide a system in which control can be exerted at reduced minimum speed, which is also a function of the sensitivity or amplifier gain of the system.

An additional object of the invention is to provide motor plugging control means having novel characteristics from the standpoint of their general application, and incorporating an entirely new concept of plugging control as applied to the stepless reversing control system hereinafter described.

As applied to crane control, the system of this invention in certain of its aspects is adapted to be used for bridge and trolley (traverse) motions as well as for hoist motions. However, since overhauling loads are not ordinarily encountered in traverse motions, the electric load brake and the control elements therefor are not required. It is accordingly a further object of the invention to provide means for utilizing the system described herein, so far as applicable, to bridge or trolley drives.

In the control of the above-mentioned Wendelburg et al. application an A.C. wound rotor motor, with the motor speed controlled by a saturable reactor and an electro-responsive braking element coupled to the motor shaft, is employed. The motor speed is regulated by means of a manually controllable master reference voltage and a speed feedback signal is simultaneously applied to two separate amplifiers which in turn determine the excitation current to the saturable reactor and the electro-responsive braking means. A speed deviation acts to increase the excitation to one control element and decrease the excitation to the other. With the master reference signal calling for minimum speed, the bias of that system is such that the braking means carries maximum excitation and the saturable reactor zero excitation. With the reference signal calling for maximum speed, the reactor is at maximum excitation and the braking means at zero excitation. With this arrangement, when the master reference signal is at intermediate values, there is always an overlap between the two control functions with both control elements partially excited because each acts simultaneously to cause the motor to run at the desired speed. The overlap of the two control elements (both being energized or excited simultaneously) forces the motor to produce more torque than is required to drive the load and causes the braking means to develop torque when none is required by the load, or, in other cases, more than is required by the load. This results in excessive power consumption of the drive and unnecessary heating of both the control and braking means, as well as the drive motor.

Further, the simultaneous action of the two control elements in that system tends to make the system unstable, and to cause overshooting the desired speed and oscillating or hunting about the control point. This seriously limits the gain or sensitivity at which the system can be operated, with a resulting limitation on the accuracy of the speed regulation.

As above indicated, it is the aim of the present invention to improve upon the system of said Wendelburg application by the use of a novel system to provide excitation for the control elements and, in addition, to make important improvements in the other control functions.

In the preferred embodiment of the system of the invention, the master signal, after being rectified, represents the desired speed. The slip of the motor rotor (which is inversely proportional to speed) is measured by a frequency detector, the output of which in a D.C. signal, or the motor speed may be measured by other speed measuring apparatus such as a tachometer generator. The two signals are mixed in a magnetic amplifier or amplifiers. If the desired motor speed is obtained the signals are such that neither the reactor nor the electric load brake is excited. However, if the speed should be less than that required by the reference signal, the brake remains unexcited and the reactor is excited to increase the motor torque and speed. If the speed increases above the desired value the brake is excited (i.e., turned on to a degree depending upon the amount of the speed error) and the reactor is deenergized (turned off). Thus the speed will be held near to the desired value under all conditions by what may be called a closed loop regulator operating from an error signal. It is accordingly an object of the present invention to provide a motor speed control system operating on this principle.

Other objects and advantages of the invention will be evident from the following description of an illustrative embodiment thereof, taken in connection with the accompanying drawings, in which:

FIGS. 6, 7 (A and B) and 8 are like diagrams of the bias supply, plugging control and off-position bias circuits, respectively;

FIG. 9 is a detail diagram of an instrument module, including an anti-hunt circuit used in the system;

Figure 1:
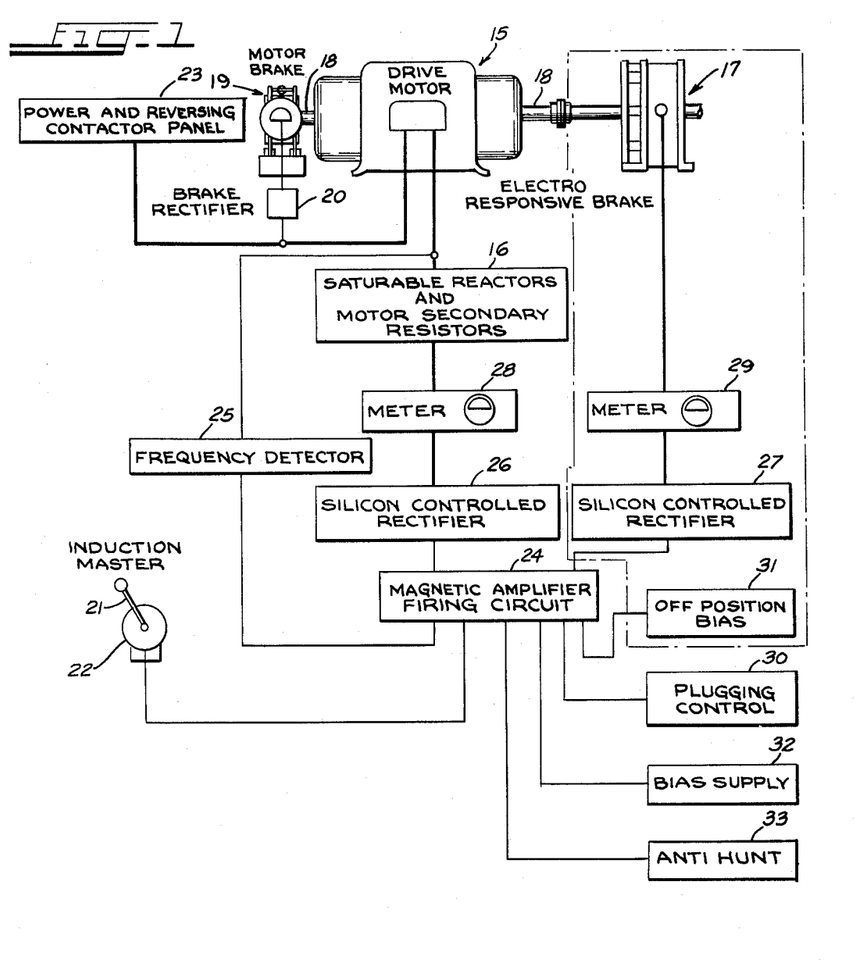
FIG. 1 is a block diagram of the elements of the system employed for hoist control, with the elements which are not required for traverse control boxed in broken lines.

The control system of the invention in the form depicted in FIG. 1 is used in drives such as those for crane hoists where loads which tend to overhaul the motor may have to be handled and in other drives where braking means other than the motor itself may be desirable. An induction motor when energized and driven in the running direction by an overhauling load develops no braking torque at any speed less than its synchronous speed. If driven above synchronous speed, braking torque is developed, since the machine becomes an induction generator returning power to the supply line. Other methods to provide braking at slower speeds have been used, such as motor countertorque (reconnecting the motor to drive opposite to the direction of rotation) and application of single phase A.C. or D.C. power to the stator of the machine. These methods are inefficient, requiring high motor currents and causing motor heating. Switching of primary motor leads is also required.

The method of control used in the system of the present invention is to connect the motor to drive in the direction of desired motion and restrain overhauling loads by means of variable torque developed by an electro-responsive brake.

A wound rotor A.C. motor is best adapted for employment as drive motor 15 in this invention. As outlined in FIG. 1, a drive motor 15 has a saturable reactor and resistance network 16 in its secondary circuit and an electric load brake 17 is coupled to the motor shaft 18, which is connected to the load through suitable gearing (not shown).

A spring-set, electromagnetically-released brake 19 is also coupled to the motor shaft. It is connected to the primary of the motor through a rectifier 20 and is adapted to be released whenever the motor is energized and to be set upon deenergization of the motor.

The direction and speed of the motor is selected by the operator by moving a handle 21 of an induction master controller 22 from a neutral or "off" position in either "hoist" or "lower" direction. Such movement of the controller handle closes contacts (not shown in FIG. 1) which actuate reversing contactors, indicated by panel 23, connecting the primary of the motor to line voltage and determining the direction of rotation. The speed of the hoist motion is determined by the position of the controller handle.

A signal corresponding to the handle position is fed from the induction master to the input of a magnetic amplifier indicated in FIG. 1 as a single unit at 24. Actually there are two magnetic amplifiers, one of which responds when the motor speed is above and the other of which responds when the motor speed is below that called for by the induction master. However the two amplifiers function as a single unit (on the order of a push-pull amplifier) so they are shown in FIG. 1 as one unit.

A frequency detector 25 connected to the motor secondary circuit produces a D.C. output proportional to the rotor frequency, which, in turn, is proportional to the slip and inversely proportional to the speed of the motor. Such output of the freqeuncy detcetor is fed to the input of the magnetic amplifier 24 where it is compared with the signal from the induction master 22.

The output of the magnetic amplifier or amplifiers is fed to two silicon controlled rectifiers 26 and 27 which, respectively, supply excitation current to the saturable reactor network 16 and the electric load brake 17. Meters 28 and 29 in series with such units, respectively, give visual indication of these excitation currents.

The circuit is so designed that whenever the motor speed is less than that called for by the induction master the saturable reactor will be excited to increase the motor torque and whenever it is greater than that called for the electric load brake will be excited to reduce the speed to the desired value. Thus it will be evident, as above pointed out, that the saturable reactor and the electric load brake are never excited simultaneously under steady state conditions. The motor torque and current are always at a minimum when the motor is driving light or overhauling loads at any speed, and the eletcric load brake is never energized when the load requires more than minimum motor torque.

A plugging control, indicated at 30, is provided in connection with the magnetic amplifier firing circuit. Such control, as will hereinafter appear, is a static switching circuit which instantly detects when the motor is plugged and acts to simultaneously apply full excitation to the electro-responsive brake and cut off excitation to the saturable reactor. Maximum braking effort is therefore obtained while the motor current is held to a minimum. This type of plugging control gives faster, more accurate and reliable operation than that afforded by the conventional plugging relay.

Another static switching circuit, known as an off-position bias circuit, identified in the block diagram by the reference numeral 31, is provided to reduce the electric load brake excitation after the induction master handle 21 is moved to the off position. Whenever the motion is slowed or stopped by moving the handle toward such off position the electric load brake is instantly excited to provide torque which slows down the drive before the motor brake 19 sets. This greatly reduces wear on the motor brake shoes and wheels. After the motion has stopped, it is desirable to reduce the excitation of the electric load brake to minimize heating of the brake and to avoid unnecessary power consumption. The off-position bias circuit acts to reduce the brake excitation a few seconds after controller handle is returned to the off position. Sufficient excitation is maintained, however, so that a full load will lower at less than 40% of the rated hook speed if the motor brake fails to hold. The foregoing operation of the off-position bias circuit is one of the reasons for the outstanding efficiency of the control provided by this invention.

A bias supply circuit and an anti-hunt circuit, identified by the blocks 32 and 33, respectively, are also provided in conjunction with the magnetic amplified firing circuit in manner and for purposes hereinafter set forth.

In the case of traverse motions, where overhauling loads are not ordinarily encountered, electro-responsive braking means is not normally required. Therefore the brake 17 and the silicon controlled rectifier 27, meter 29 and off-position bias circuit 31 may be omitted in the traverse control system. In this case if the motor speed is greater than that called for by the induction master (as when the master handle has been moved quickly toward neutral) the amplifier shuts off the saturable reactor current, reducing the motor torque to a minimum and the drive will then coast. If it is desired to slow the motion rapidly, the motor can be plugged. A unique plugging control is provided for this purpose, as will be hereinafter described.

Referring now to the schematic wiring diagram of the hoist control (FIG. 2), the induction master 22, by which both the speed and direction of rotation of the drive motor 15 are controlled, is shown in the lower left hand corner of the figure.

Figure 2:
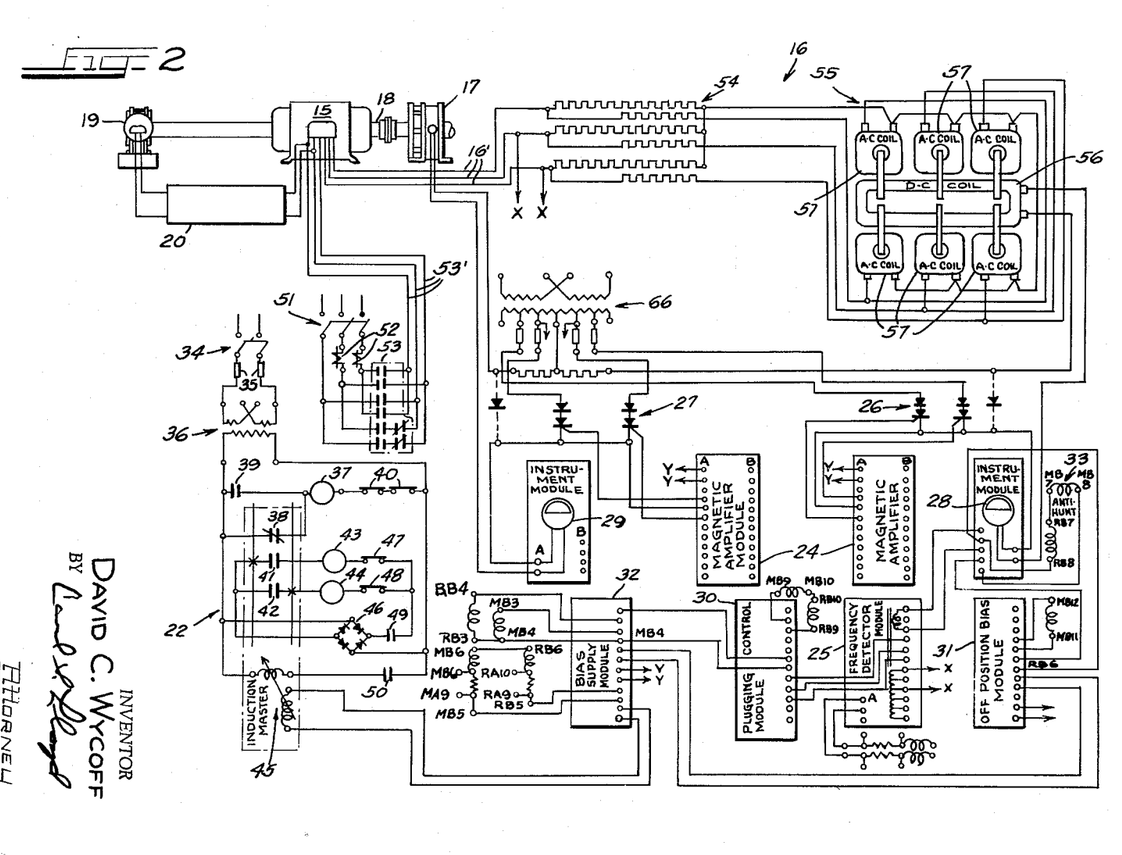
FIG. 2 is a schematic wiring diagram of the system as used for hoist control.

Power is supplied to said induction master from a source of line voltage through the manual disconnect switch 34, fuses 35, and a transformer 36. An under-voltage relay, the coil of which is indicated at 37, is incorporated to prevent accidental starting of the motor.

Said under-voltage relay coil 37 receives its power from the secondary of the transformer 36 and through a normally closed contact 38, which is part of the induction master and is closed only when the handle 21 of the master is in its neutral or off position. In parallel with the contact 38 a normally open contact 39 is provided as a maintaining contact for the under-voltage relay coil 37. In series with said under-voltage relay coil are two overload relay contacts 40.

The operation of this circuit is such that if power is applied to the transformer 36 with the master handle in the neutral position, the under-voltage relay picks up or closes and maintains itself closed through the contacts 39 until such time as line voltage is removed from the transformer or the overload relays trip. The circuit is so designed as to prevent the accidental starting of the drive motor 15 if power is applied through the transformer 36 with the master handle off neutral. In addition, it prevents the restarting of the motor in case the overload relays trip and reset themselves before the operator returns the master to the neutral position.

Movement of the induction master handle 21 a certain distance away from neutral operates one or another of switch contacts 41 and 42, depending on the direction of movement. The actuated switch contact closes, energizing a coil 43 or a coil 44, as the case may be, of the reversing contactor 23, thus connecting the drive motor 15 to line voltage.

At this point voltage from the windings 45 of the master 22 calls for minimum speed. This position of the induction master is called the "first point" position. The operated switch 41 or 42 remains closed in all positions of the master handle beyond this point. The extreme throw of the master handle away from neutral in the forward direction is called the "full-on" position and calls for maximum motor speed.

The energizing of the coil 43 or the coil 44 closes corresponding contacts in the reversing contactor unit 23. Said contactor coils 43 and 44 are energized from the transformer 36 and a rectifier 46.

Electrical interlocks 47 and 48 are connected in series with the contactor coils 43 and 44, respectively, to prevent the energization of both simultaneously. An under-voltage relay contact 49 interrupts the power supply to the reversing contactor coils 43 and 44 in case of power failure or tripping of the overload relays. An under voltage relay contact 50 removes voltage from the master signal windings 45 under the same circumstances.

Power is supplied to the motor primary through a manual disconnect switch 51, overload relay coils 52 and the contacts 53 of the reversing contactor unit 23, said contacts being connected to the motor primary by leads 53'. In case of an overload on the motor, sufficient current is drawn through the overload relay coils 52 to actuate an electro-magnetic device (not shown) which in turn opens the overload relay contacts 40.

The induction master 22 performs two separate functions in the operation of the control. First, it controls the reversing contactor 23 in the manner above described and, second, as above indicated and as hereinafter more fully explained, it furnishes a continuously variable A.C. voltage which increases linearly with handle throw on each side of the "off" position, providing a signal which, when rectified to D.C., is used as a command or reference signal which determines the speed at which the motor will run.

The motor brake 19, as hereinabove indicated, is a spring set, magnetically released unit. Brake release is accomplished by a magnetic coil (not shown), which is energized through the rectifier 20, which, in turn, is energized from the primary terminals of the motor 15.

The motor secondary, as shown in said FIG. 2, is connected to a resistor unit 54 and, in turn, to a saturable reactor unit 55, which units comprise the network 16 above mentioned. Said network is connected to the motor secondary by leads 16'.

The saturable reactor comprises a D.C. control coil 56 and A.C. load coils 57. A saturable reactor is a known device used to control the flow of current in a motor secondary through a secondary resistance, thereby controlling the speed and torque of the motor in response to the excitation current flowing in the D.C. control coil. When the control coil is unexcited the speed and torque of the motor are at a minimum and when it is fully excited such speed and torque are at a maximum. It is believed the reactor and resistance network therefore need not be described in detail.

The other units shown in FIG. 2 and their functioning will be referred to in connection with detail circuit diagrams of each thereof hereinafter described.

Also further reference to FIG. 3, the schematic diagram of the traverse control, will be left to the description of that control hereinafter contained.

Figure 4:
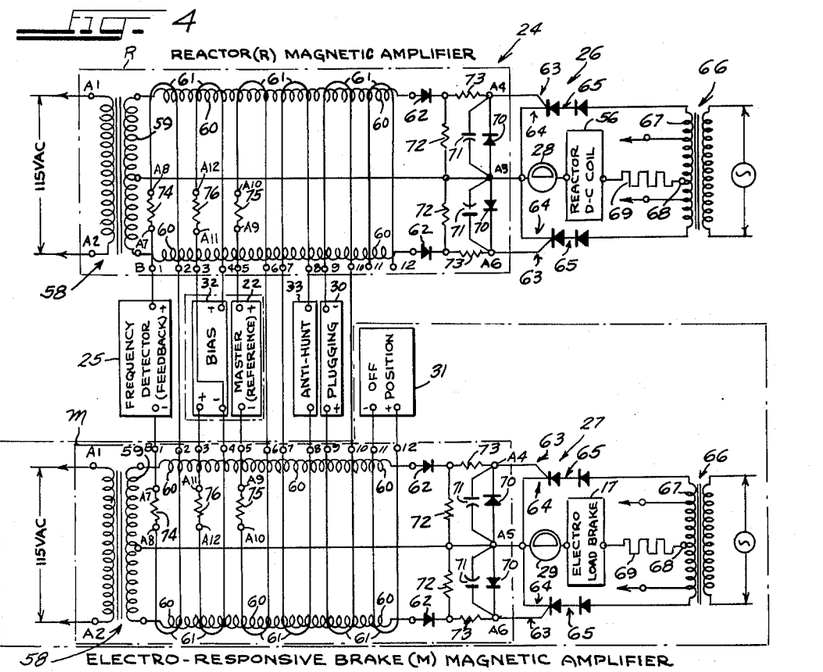
FIG. 4 is a schematic diagram of the magnetic amplifier firing control for hoist motions, with the parts thereof which are omitted for traverse motions boxed in broken lines.

Referring now to FIG. 4, the magnetic amplifier firing control for hoist motions will be described. As shown in this figure, the amplifying system is designed around two basic elements. The first of these elements is the magnetic amplifier firing circuit, identified generally by the reference numeral 24 but shown here and in FIG. 2 as two amplifiers "R" and "M." The second basic element is the assembly of silicon controlled rectifiers 26 and 27 which are connected in a full wave center tap rectifier circuit. These elements could be replaced by other types of elements which could perform the same functions. Any device which would receive the input signals, derive their sum, produce an appropriate output to control two amplifying output elements capable of producing an output of sufficient magnitude could be used. Typical input elements could consist of saturable reactors, tube or transistor pre-amplifiers or phase shifting circuits. Output elements could include magnetic amplifiers, thyratron tubes, or transistors.

In the system described the control signals are summed or mixed magnetically in the control windings of the magnetic amplifiers. This is known as internal mixing. External mixing could be used where the signals are summed in resistance networks and only the final or error signal applied to amplifying elements.

The two magnetic amplifier input elements "R" and "M" are interconnected to function as a single unit, as stated earlier herein. The silicon controlled rectifier assemblies 26 and 27 function as output elements, one of which supplies variable excitation to the saturable reactor in the motor secondary and the other of which supplies variable excitation to the electric load brake.

The operation of self-saturating magnetic amplifiers per se is well understood by those skilled in the art and therefore need not be described in complete detail.

Each magnetic amplifier R and M includes an input transformer 58, the primary terminals, marked A1 and A2, of which are connected to a 115 volt A.C. supply of the correct phase relationship. The resulting voltage induced in the secondary winding 59 of the input transformer tends to cause current flow through magnetic amplifier load coil or output windings 60 which are connected to such transformer secondary winding 59. Control windings of the amplifiers are indicated at 61. If the flux in the common core (not shown), on which said load coil windings 60 and said control windings 61 are wound, is such that the core is not saturated during the half cycle of the voltage wave so that current could flow through diode rectifiers, indicated at 62, which are in series with the load coil windings 60, the load coil absorbs practically all of the input transformer voltage and no output appears at output terminals A5 and A4 or A5 and A6 of the amplifiers.

Under certain conditions of core flux, such as when there is no current flowing in the control windings 61, which are connected to terminals B1–B12, the voltage of the input transformer secondary is sufficient to saturate the core, under which conditions the impedance of the load coil windings 60 is suddenly reduced and a fast rising voltage pulse appears at terminals A5 and A4 on one half cycle of the voltage wave and at A5 to A6 on the next half cycle thereof. By varying the control winding current, the start of fast rising voltage across the output terminals can be made to occur any time during the conducting half cycle. In effect, then, the magnetic amplifier functions as a switch which applies a steep front voltage pulse across the output terminals A4, A5 and A6 at any time during the conducting half cycle, depending on the magnetic state of the core material just preceding the conducting half cycle.

As far as the output is concerned, the amplifier becomes a phase shifting device which acts in response to the current in the control windings 61. The flux in the magnetic amplifier core just prior to the conducting half cycle of supply power is a function of the sum of the ampere turns of all the control windings, with the polarity of the windings and the current therein taken into account.

The output of the magnetic amplifiers is connected to gates 63 of the silicon controlled rectifiers 26 and 27, respectively. Such silicon controlled rectifiers are semiconductor devices which block the flow of current in either direction unless sufficient current flows in the gates 63 to the cathodes 64 of the rectifier circuit. The gate current causes the resistance to current flow in one direction to suddenly drop to a very low value, under which condition current flow is determined by the applied voltage and the load resistance. The sudden lowering of resistance is called firing.

Once the device has fired it cannot revert to its high resistance state until the current from the anodes 65 of the rectifier circuit to the cathodes 64 of the circuit is reduced to zero, or nearly so. In the absence of gate current, when the anode goes to zero and reverses, as in an A.C. circuit, the silicon controlled rectifier reverts to its high resistance condition and will not conduct until it is fired again.

Thus, it is apparent that the silicon controlled rectifiers can be used to control the amount of average D.C. current in the electrical load by controlling the firing so that conduction takes place at various times during alternate half cycles of the voltage wave of an anode transformer 66, one of which is incorporated in each magnetic amplifier-silicon controlled rectifier assembly. Load current flows from the anode transformer secondary 67 alternately through the related silicon controlled rectifier, through the reactor control coil or the electric load brake coil, as the case may be, and back to a center tap 68 of the transformer through a forcing resistor 69.

Thus, under the influence of signals applied to the control windings 61 of the magnetic amplifier firing circuits, the excitation current of the saturable reactor and the electric load brake can be controlled from essentially zero to a maximum.

Diodes 70, which are connected across the magnetic amplifier outputs in series with the silicon controlled rectifier, prevent the application of reverse voltage to the gates 63 by absorbing a share of such voltage during the non-conducting half cycle. Capacitors 71 in the same location are used to prevent firing of the silicon controlled rectifiers are from noise pulses. Shunt resistors 72, which are also connected across the magnetic amplifier outputs, form a discharge path for the capacitors. Series resistors 73 limit the gate voltage applied. The forcing resistors 69 serve to limit the maximum load current that can flow to safe values for the circuit components. Terminals A7–A8, A9–A10 and A11–A12 are connections to resistors 74, 75 and 76, which are in series with the frequency detector, master and bias supply control windings, respectively. They are provided so a voltmeter can be used to measure the current through these windings. (One volt equals 10 milliamperes.)

Figure 3:
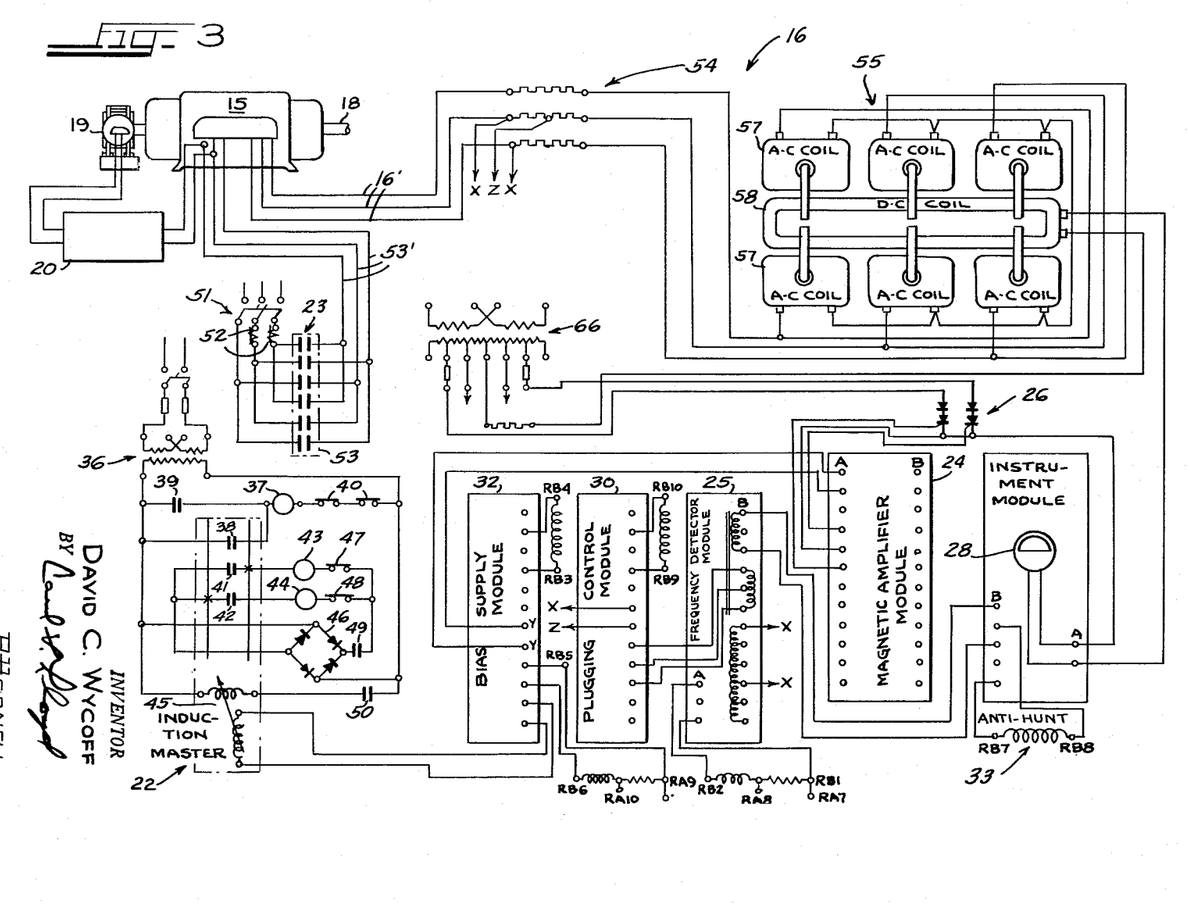
FIG. 3 is a similar diagram showing the system as used for traverse (bridge or trolley) control.

The signals applied to the various magnetic amplifier control windings are illustrated in FIG. 4 by blocks, as in FIGS. 1, 2 and 3. The circuits therefor will be hereinafter separately described in connection with detail circuit diagrams (FIGS. 5–9) but before leaving the description of the elements shown in FIG. 4, attention is called to the scheme of schematic and wiring diagram lettering and numbering used in this figure, which is carried into FIGS. 2 and 3 and certain of the other circuit diagrams. The magnetic amplifier control of "B" windings of the amplifier "R" which controls the reactor excitation are identified as RB1, RB2 etc. and those of the amplifier "M" which controls the electric load brake excitation are identified as MB1, MB2, etc. The respective windings are shown adjacent to the module that supplies the signal. For example, on the frequency detector the minus terminal is connected to MB1, the "B1" terminal on the electric load brake magnetic amplifier. The other end of the control winding is connected to RB2 and RB1 is connected to the positive terminal on the frequency detector, completing the circuit. The same lettering and numbering scheme is used for all the "B" or control windings.

Figure 5:
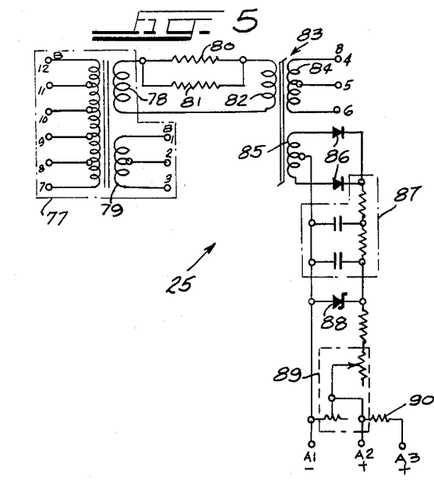
FIG. 5 is a detail diagram of the frequency detector circuit.

The frequency detector or feedback signal, the circuit for which is shown in FIG. 5, is a D.C. signal proportional to the frequency of the motor rotor voltage, which in turn is proportional to slip or relative speed of the rotor with respect to the rotating stator field. The motor speed is numerically proportional to $1-S$ where S is the slip in percent of synchronous speed. Thus in the magnetic amplifier control winding, the motor speed can be represented by a constant signal applied to a bias (constant control signal) winding with a positive polarity and a value proportional to slip with a negative polarity, applied to another control winding.

The frequency detector is basically a transformer operated with a voltage applied to the primary winding sufficient to saturate the magnetic core (not shown) which is made of laminated steel with a square hysteresis loop characteristic. A transformer constructed and operated in this manner produces constant volt second pulses at its secondary terminals for each half cycle of input frequency. If the transformer secondary is connected to the magnetic amplifier control winding through a suitable rectifier and filter circuit, a D.C. signal proportional to frequency is obtained.

Since the voltage and frequency generated in the motor rotor windings both vary with speed, the ratio of generated rotor voltage to frequency is constant. However, the voltage appearing at the rotor slip rings is less than the generated voltage by an amount depending on the impedance of the rotor windings and the rotor current, so the rotor voltage, as measured at the slip rings of the machine, is not constant at any given rotor speed. By designing the frequency detector primary to be saturated at the lowest slip ring voltage for a given slip, the effect of the varying voltage can be eliminated. For a constant voltage to frequency ratio, the transformer remains saturated at any voltage or frequency. The output of the frequency detector is therefore a true function of speed.

The actual frequency detector circuit shown in FIG. 5 includes an input transformer 77 with taps to accommodate motors with different rated rotor voltages. The input transformer has two secondary windings 78 and 79. The secondary 79, which is connected to terminals B1–B3, furnishes voltage to the anti-hunt circuitry which is shown in block at 33 in FIGS. 1–4 and will be described later. The other secondary 78 furnishes power through load limiting resistors 80 and 81 to the primary 82 of an output transformer 83.

The saturated transformer 83 has two outputs 84 and 85. The secondary 84, with terminals B4–B6, is used in connection with the plugging circuit which is shown in block at 30 in FIGS. 1–4 and will be described later. The voltage from the other secondary 85 is rectified at 86, filtered at 87, and applied across a zener diode rectifier 88, which is so designed as to limit the maximum output to a value corresponding to zero speed of the motor.

The rectified output from the element 88 is applied to an L-pad attenuator 89 which makes it possible to attenuate the signal without changing the loading of the circuit. Three output terminals A1–A3 are provided and a resistance 90 is connected in series with one thereof so that either one or two control windings of the magnetic amplifier firing circuit can be energized without changing the loading of the frequency detector output. To provide the correct detector output impedance A2 is used when two magnetic amplifiers are provided and the terminal A3 when only one is provided.

Thus, with the input transformer 77 suitably connected to a single phase of the rotor slip rings, a signal proportional to the slip of the rotor (from stall to synchronous speed) flows through the control windings, with B1 and B2 terminals, on the "R" and "M" magnetic amplifiers, furnishing the speed feedback signal thereto. The frequency detector polarity is such that increasing speed (decreasing slip and frequency) is in a direction to turn off the saturable reactor magnetic amplifier R and turn on the electrical load brake magnetic amplifier M.

Referring now to the bias supply circuit (FIG. 6), this part of the system performs two functions. First, it furnishes regulated bias voltages to the control and, second, it rectifies the A.C. signal from the induction master to D.C.

Figure 6:
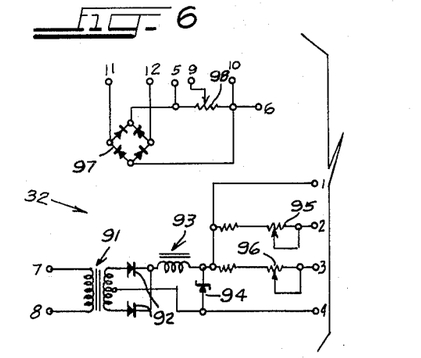

115 volts A.C. is applied to terminals 7 and 8. This voltage is transformed by a transformer 91, rectified at 92, filtered at 93, and regulated by means of a zener diode 94 to the required value. The voltage between terminals 1 and 4 furnishes a constant signal to the plugging circuit for hoist motions. The application of this voltage is described in connection with the plugging circuit. The voltage between terminals 4 and 2 and 4 and 3 is adjustable through the bias rheostats 95 and 96 and furnishes bias (through control windings 61 connected to the B3 and B4 terminals—see FIG. 4) to the saturable reactor magnetic amplifier "R" and the electric load brake magnetic amplifier "M," respectively.

Each magnetic amplifier requires a small bias signal to adjust it to zero output, with no net control signal in the other windings. Also, a small amount of bias is used to cancel the effects of whatever master signal is present in the just-on position of the master, so that the just-on position calls for zero (or other desired value) speed. The remainder of the bias signal, however, is to satisfy the relationship that was previously discussed in connection with the frequency detector, i.e., to furnish the constant signal necessary to convert the frequency to speed according to the relationship speed (1—frequency of rotor voltage). The bias signal required is equal to the frequency detector signal at stall, and the polarity of the bias is opposite that of the frequency detector, thus indicating subtraction.

The A.C. signal from the induction master 22 is applied to terminals 11 and 12. It is then rectified by rectifiers 97 to D.C. and fed to a master signal potentiometer 98, the output of which is connected to positive terminal 9 and negative terminal 10. The voltage is applied to the windings 61 connected to the terminals B5 and B6 (FIG. 4) of the magnetic amplifiers where it becomes the speed reference signal. For hoist motions where an electric load brake is employed a signal from terminals 5 and 6 is applied to the off position bias circuit (block 31), illustrated in detail in FIG. 8. Its function there will be described in connection with that circuit.

Figure 7A:
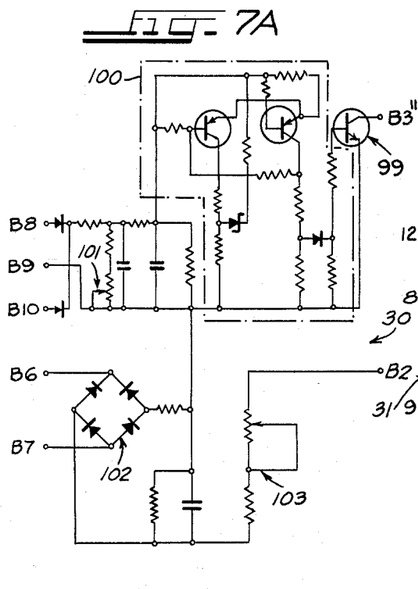
Figures 7B, 9:
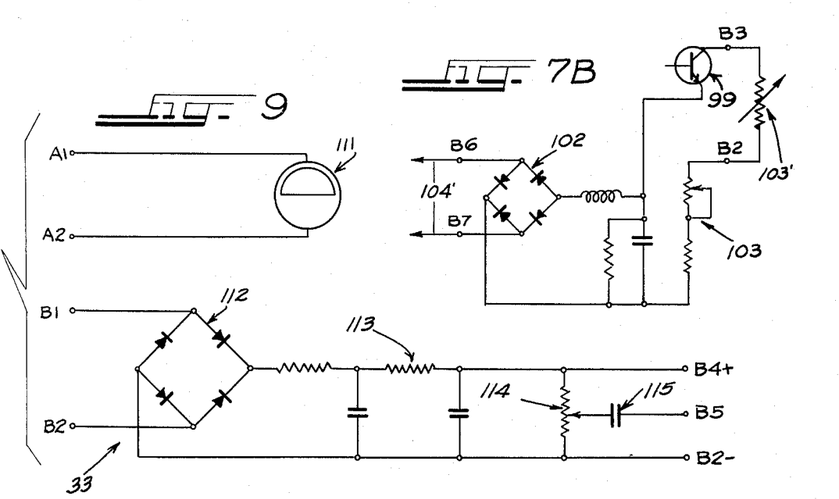

The function of the plugging control circuit shown in FIGS. 7A and 7B is to modify the amplifier response in case an operator, with the drive motor running in one direction, suddenly reverses the motor torque by moving the controller handle from one direction of throw to the other. The act of stopping or reversing a motor by connecting it to run opposite to its direction of rotation is known as plugging. High motor currents and low torque per ampere of motor current result when a wound rotor motor is plugged, unless preventative action is taken by the control.

The aforesaid Wendelburg application discloses a static circuit to detect plugging and modify the speed feedback signal magnitude in such a manner that it indicates to the amplifier that the speed is in the proper direction and greater in magnitude than called for by the master controller. This information, when fed into the amplifier inputs, causes the saturable reactor excitation to be cut off and the electric load brake excitation to be full on. This system has obvious advantages over electromagnetic plugging relays. However, since the signal is derived from the motor slip ring voltage, it is not a true function of motor speed. The voltage at any given speed varies with motor current. Furthermore, although the signal used to obtain the desired amplifier output during plugging is larger than the normal feedback signal, it is still a function of motor speed and thus approaches zero with the motor speed. It follows that with that system plugging protection cannot be maintained from full reverse speed to zero, because at some appreciable reverse speed the plugging signal will fall below the level necessary to hold the desired condition (i.e., the reactor off and the electric load brake on).

The plugging control of the present invention is designed to maintain the desired plugging conditions over the complete plugging cycle. The manner in which this is accomplished will now be described.

The circuit, as shown in FIG. 7A, incorporates a static switch in the form of a transistor 99 whose output appears on terminals B2 and B3 which are connected to corresponding magnetic amplifier control windings. The static switch is turned on and off by a two-transistor Schmitt trigger circuit 100. The input to the trigger, through terminals B8, B9 and B10, is from the secondary winding 84 of the frequency detector saturating transformer 83 (FIG. 5). The signal from this winding is proportional to slip over the entire range from synchronous speed to full plug (0–120 cycles with a 60 cycle machine). The trigger is adjusted to turn on the static switch at just over the stall frequency, say 62 cycles, by means of a trigger point potentiometer 101. The switch will not turn off until the motor has stopped, or nearly so, or until the rotor frequency has dropped to a predetermined point near the stall frequency.

The object of the plugging control is to reverse the motor as quickly as possible with a minimum of motor current and heating. The most efficient and effective method of slowing the hoist drive is by application of full excitation to the electric load brake. At the same time it is desired to shut off excitation to the saturable reactor, thus minimizing motor currents during plugging. To accomplish this constant voltage from terminals 1 and 4 of the bias supply circuit (FIGS. 2 and 6) is fed to terminals 6 and 7, and thence through rectifiers 102 and a sensitivity control 103 of the plugging control circuit.

Thus, when the motor is plugged, the transistor switch 99 turns on, allowing a heavy control current to flow in the magnetic amplifier control windings in direction to excite the electro-responsive brake and shut off excitation to the saturable reactor. The magnitude of the control winding current is large enough to completely swamp or override other control signals in the magnetic amplifiers. Since the signal used to energize the control winding is constant and not a function of speed, and all other signals in the control windings are constant (except possibly the master signal), full protection against excessive motor currents is obtained during the entire plugging cycle.

In the case of the static stepless reversing (bridge or trolley) control for traverse motions the operation is similar but the results are quite different. Instead of applying a constant signal from the bias supply circuit (as shown in FIG. 2) to terminals 6 and 7, a signal proportional to motor current, and hence motor torque, is applied to these terminals (see FIG. 3). When the motor is plugged, the control thus automatically shifts from speed regulation to torque regulation. During plugging the motor torque varies in dependence on the position of the master handle. Thus the operator can control the plugging torque steplessly over the full range from minimum to maximum and can hold it constant at the desired value as the drive decelerates.

The signal in this case is fed through the static switch 99 (FIG. 7A) to a control winding of the R magnetic amplifier where it is compared with the induction master signal. As noted above, this allows the desired torque to be selected during plugging by positioning the induction master handle 21. When the motor has decelerated to zero speed, or nearly so, output from the plugging control circuit is switched off by the static switching circuit and the control reverts to speed regulation. This static circuit is faster and more accurate and reliable than any plugging relay (such as is ordinarily used) could be.

A modified bridge or trolley plugging circuit which produces results only slightly less desirable than that obtained with the circuit shown in FIG. 7A is shown in FIG. 7B. The same plugging control would be used but connected somewhat differently. The basic idea is to detect the plugged condition of the motor as before. During plugging no feedback signal is applied, so the system reverts to an open loop control system. The excitation of the saturable reactor 55 is made responsive to the position of the master handle 21. The saturable reactor excitation would be zero or a minimum at "first point" and increase with handle throw until it reaches a maximum in the "Full On" position of the master.

To accomplish this all the control remains the same, except that, as stated above, the motor current feedback signal is removed entirely. The master signal must be reduced since only a small fraction of such signal is sufficient to cause a maximum excitation current. A number of methods which will be obvious to those skilled in the art could be used to change the system so that during plugging full master throw is required to obtain the maximum excitation current desired. For example, the master signal could be transferred by relay or static switching to a control winding on the magnetic amplifier firing control having fewer turns.

The preferred circuit makes use of a design characteristic of the master used. As increased load or signal is drawn from this unit the voltage of the device drops very rapidly. It is therefore possible to adjust the maximum master voltage by increased loading. By connecting a variable resistor 103' or other resistive element across terminals B2 and B3 of the plugging control module, and connecting a parallel circuit 104' from the master to input terminals 6 and 7, additional loading can be placed on the master during the plugging cycle.

By adjusting the impedance of the load thus connected across the terminals B2 and B3, the maximum master voltage can be reduced to a value which, when applied to the magnetic amplifier control windings in normal manner, will be just sufficient to obtain maximum saturable reactor excitation current.

Under this condition, then, the excitation current to the saturable reactor 55 can be varied from zero (with master in "Just On" position) to a maximum (with master in the "Full On" position). This, in turn, makes it possible to vary motor torque between a minimum and a maximum, depending on master handle position, although the relationship between the two may not be linear and may also vary as a function of speed. The system disclosed in FIG. 7A has the advantage of reducing this variation and also making motor torque more linear with master handle position.

Figure 8:
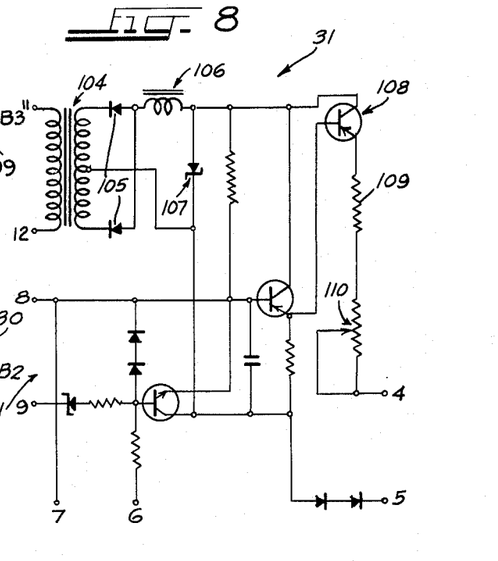

Another control function is used in connection with the control of the present invention, namely, the off position bias circuit (block 31 and circuit diagram, FIG. 8). This control function is also disclosed in the above-mentioned Wendelburg application and is included here only because of an improved static circuit for obtaining the same function and at the same time improving its performance. The off position bias circuit as shown schematically in FIG. 8 supplies a signal that reduces the electro-responsive brake excitation during those periods when the hoist motion is not operating. Excitation is reduced in two to three seconds after the master is returned to neutral. Therefore, the brake exerts high retarding torque for decelerating the motion. After the motion has stopped, reduced excitation avoids unnecessary heating and power consumption, but it is still sufficient to limit the speed of the load if the motor brake fails to hold.

As shown in FIG. 8, a 115 volt 50 cycle A.C. supply is connected to terminals 11 and 12 of the off position bias circuit. This is transformed by transformer 104, rectified by rectifiers 105, filtered by a choke 106 and regulated by a zener diode 107. A signal, proportional to induction master output, from the bias supply module (FIG. 6) is connected to terminals 8 and 9. A signal proportional to the motor secondary voltage, is introduced at terminals 6 and 7. When the induction master handle is in the "off" position, its signal output is almost zero. The signal from the motor secondary is zero. Two to three seconds after this condition occurs, the zener regulated voltage of approximately 8 volts is supplied through a transistorized circuit 108, a fixed resistance 109 and a level control rheostat 110 to terminal 5 and terminal 4. These terminals are connected to an electro-responsive brake magnetic amplifier control winding. Correct "off" position brake excitation is obtained by adjusting the level control after the induction master has been in the "off" position for sufficient time for the static switch to have turned off. Application of either master signal, motor secondary voltage or both trips the transistorized static switching circuit off and removes the off position bias signal.

To eliminate any tendency of the system to overshoot the desired speed or for the speed to oscillate about the desired steady value due to high gain, response time, or linearity of control elements, an anti-hunt circuit is provided. Such circuits are well known and the one disclosed, as such, forms no part of the present invention. The input to the anti-hunt circuit is derived from the motor secondary voltage, although it might be taken from motor current, the frequency detector, or other sources.

This circuit is incorporated in an instrument module illustrated in FIG. 9. This module contains an ammeter 111 which measures the saturable reactor excitation current. (A separate meter is provided for the electro-responsive brake circuit in the case of hoist motions.) Terminals A1 (positive) and A2 (negative) are connected to the ammeter.

Terminals B1 and B3 receive an A.C. voltage from the secondary 79 of the input transformer 77 in the frequency detector module (FIG. 5). This voltage is rectified at 112, filtered at 113 and supplied to negative terminal B2, anti-hunt potentiometer 114 and positive terminal B4. The potentiometer 114 supplies a signal to terminal B5 through a condenser 115. Therefore the anti-hunt or rate feedback voltage appears between terminals B2 and B5 only while the motor secondary voltage is changing. It is accordingly proportional to the rate of change of the motor secondary voltage and roughly proportional to the rate of change of motor speed. The signal from the terminals B2 and B5 is fed through the magnetic amplifier control windings connected to terminals B7 and B8 (see FIG. 4). As the desired speed of the motor is approached acceleration is reduced and the control responds to thereby maintain the desired speed without hunting.

Figure 10A:
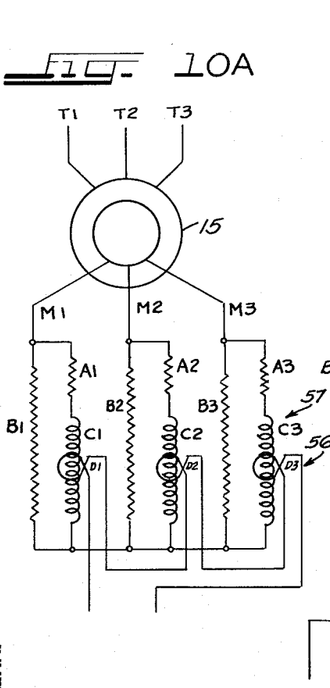
FIG. 10A is a schematic diagram of the motor secondary circuit (showing a resistance-saturable reactor network) for hoist motions and FIG. 10B is a variation of the same circuit.
Figure 11:
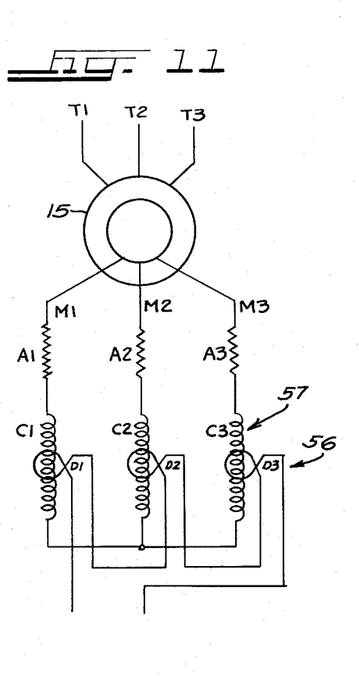
FIG. 11 is a like diagram of such motor secondary circuit adapted for traverse motions.

The manner in which the saturable reactor-resistance networks of the hoist control and traverse control, respectively, are connected in the motor secondary is schematically illustrated in FIGS. 10A and 11. Where speed control of the motor must be maintained while driving variable loads than require torques considerably less than rated motor torque, such as is usually the case with crane traverse motions where larger motors than are required to drive the crane hoist motion are used to obtain fast acceleration, the circuit shown in FIG. 11 may be employed. In this figure and in FIG. 10A, the motor primary is indicated by the symbols $T_1$, $T_2$ and $T_3$ and the secondary by the symbols $M_1$, $M_2$ and $M_3$. The permanent or slip resistance of the motor is indicated at $A_1$, $A_2$ and $A_3$. The saturable reactor A.C. load coils are identified by the symbols $C_1$, $C_2$ and $C_3$ and the D.C. saturating or excitation coils by the symbols $D_1$, $D_2$ and $D_3$.

In the case of traverse motions deenergization of the D.C. excitation winding of the reactor reduces the motor torque essentially to zero, since the load coils $C_1$, $C_2$ and $C_3$ of the saturable reactor have very high impedance. The relatively high permanent resistance gives good starting and plugging characteristics. However, at rated motor torque and with the saturable reactor fully excited, the motor speed is relatively low and therefore this arrangement is not used where both rated motor torque and high motor speeds (low slip) are required. In that case the circuit shown in FIG. 10A is commonly used.

In the circuit of said FIG. 10A the permanent resistance $A_1$–$A_3$ is kept low. With just that resistance and the reactor load coils ($C_1$–$C_3$) in series, the motor current required for a given torque becomes quite high and plugging torque quite low. To counteract this condition starting resistance elements $B_1$, $B_2$ and $B_3$ are connected in parallel with the permanent resistance elements $A_1$, $A_2$ and $A_3$. This somewhat reduces motor currents at reduced speeds when hoisting heavy loads and gives appreciable torque (approximately 50%) for hoisting if excitation to the saturable reactor should fail. The starting resistance elements $B_1$–$B_3$ are essentially shorted when the saturable reactor is fully excited.

The inclusion of such B resistance elements not only makes the motor secondary circuit more resistive (thus reducing the motor current per unit of motor torque) but also increases the maximum motor torque at zero and slow speeds, while not interfering with high speed, high torque operation. At the same time the control characteristics are changed, since the motor now has appreciable torque at stall, even with no excitation current in the saturable reactor, and therefore high impedance in the reactor A.C. load coils 57.

With the resistance values normally used, the motor torque at stall is 50% rated. This is desirable in the hoist motion because it prevents the hoist motor from lowering momentarily when hoisting is desired prior to the time that the reactor can be excited to increase the motor torque sufficiently to hoist a heavy load. It also furnishes "kick off" torque in the lowering direction with a light load.

Figure 10B:
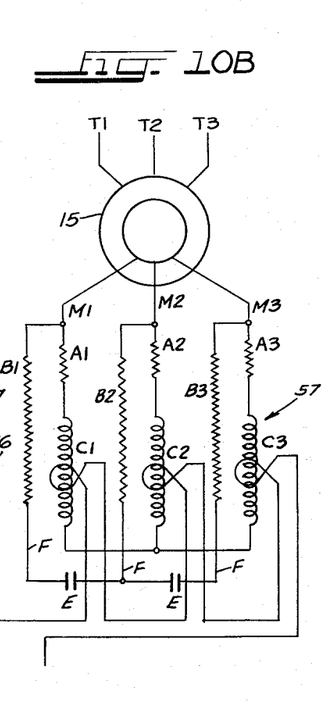

However, it may be desirable in certain applications to have minimum motor torque greater in one direction than in the other. For best speed control the minimum torque should be zero in the lower direction and under certain conditions it would be desirable to have minimum torque of up to 100% in the hoist direction. This can be provided for by varying the network as shown in FIG. 10A to the form shown in FIG. 10B. Here two contacts E are provided in a connection F between the starting resistance elements B1, B2 and B3. These contacts operate at the same time as the primary reversing contactors 23 which connect the motor to hoist. They are closed in one direction of motor rotation and open in the other. The minimum motor torque with the contacts open (in the lower direction) is essentially zero, since motor secondary current is blocked by the saturable reactor. The minimum torque in the other (hoist) direction is determined by the resistance in series with the contacts, and could be made any value desired. This circuit is useful in hoist work where the minimum hoisting torque is made equal to full load and minimum lowering torque essentially zero. This makes for improved speed regulation and efficiency with the hoist control.

It will of course be understood that various other modifications and adaptations of the configurations and parameters of the reactor-resistance network may be made within the purview of the invention.

Figure 12A:
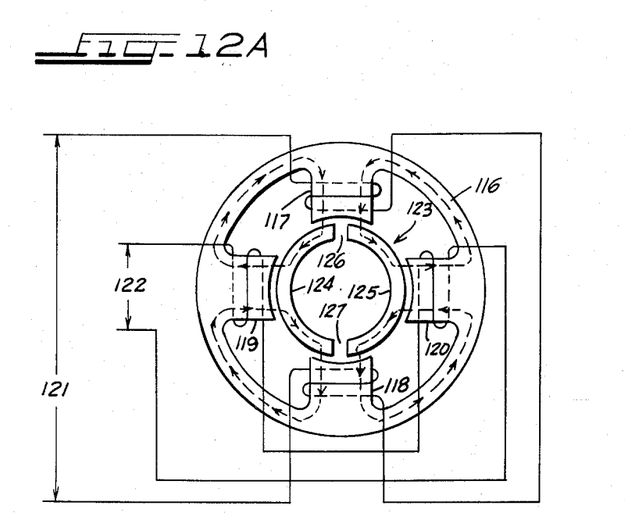
FIGS. 12A and 12B are diagrammatic views of the induction master controller.
Figure 12B:
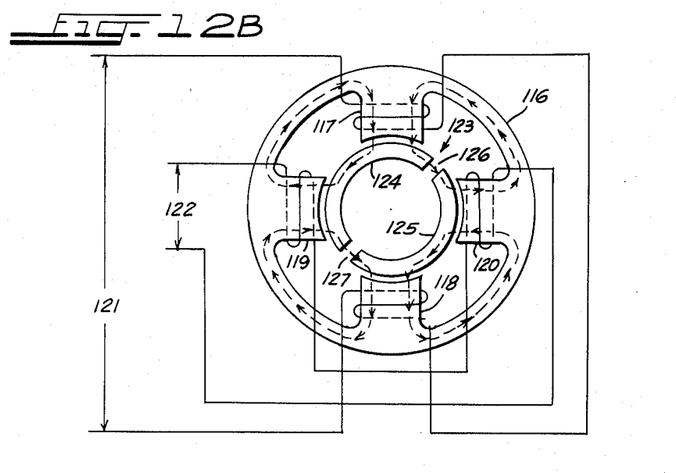

Certain of the physical structure of the induction master controller and the primary and secondary windings on the stator thereof are shown in FIGS. 12A and 12B. As there shown, a field frame 116 (the stator of the device) is provided with opposed primary poles 117, 118 and with corresponding secondary poles 119, 120 disposed at right angles to said primary poles. A primary winding 121, which is energized from transformer 36 (FIG. 2), is wound on the poles 117, 118 and a secondary winding 122 on the poles 119, 120, such windings being so wound on said stator poles that the magnetomotive flux generated by the respective windings will be in the direction and in the paths indicated by the arrows in said FIGS. 12A and 12B.

A rotor 123, in the form of a laminated split ring having two magnetically insulated arcuate armature sections 124 and 125, is concentrically disposed within the stator 116 slightly spaced inwardly from inner curved faces of the primary and secondary poles 117, 118 and 119, 120, respectively. Air gaps 126 and 127 between said armature sections 124 and 125 magnetically separate them so that little or no flux will leak between them.

The rotor 123 is movable in one direction or the other by operation of the induction master handle 21. When it is in the position shown in FIG. 12A, which represents the neutral position of the handle, the air gaps 126 and 127 are aligned with the mid-points of the stator poles 117 and 118 and the armature sections or segments 124 and 125 bridge between the respective primary and secondary poles. In this position the theoretical voltage output of the secondary winding 122 will be zero, since the flux generated by the primary winding on the primary poles 117, 118 cancels out in the secondary poles 119, 120.

When the rotor is in the position shown in FIG. 12B, which represents a position of the master handle after it has been moved away from its neutral or "off" position, the air gaps 126 and 127 are in position to intervene in the magnetic circuit of two of the flux paths, since magnetically separated portions of the rotor bridge between the respective primary and secondary poles. Accordingly the flux flowing in the two interrupted paths is much weaker than that flowing in the two uninterrupted paths so it does not cancel out the flux in the latter paths and there will be a net flux flowing through the secondary poles 119, 120, which will induce voltage in the secondary winding 122. A variable voltage signal is thus provided, through the circuitry shown in FIGS. 2 and 3, to the magnetic amplifier or amplifiers, generally indicated at 24, and related elements which control the saturable reactor secondary resistance network 16 and, in the case of hoist motions, the electric load brake 17, as above described.

Specific details of the induction master design are not, as such, a part of the present invention and it is believed they therefore need not be further described. They may be varied considerably as conditions may require. One design which, in substance, may be adapted to the control system of this invention is shown and described in the above-mentioned Wendelburg application Ser. No. 591,-683, being particularly illustrated in FIGS. 12–17 thereof.

When the system of the invention is used for bridge and trolley control (traverse motions) the elements enclosed broken lines in FIGS. 1 and 4 may be omitted and the circuitry may be as shown in FIG. 3. The electric load brake 17 is omitted, as is the "M" magnetic amplifier shown in FIG. 4, the second silicon controlled rectifier (27) and related anode transformer 66 and meter 29, and the off position bias module 31. Otherwise the elements employed and their operation are essentially the same as in the system hereinabove described in which both motor speed control and electric load brake control are involved. The operation of this bridge and trolley or reversing control will be hereinafter more specifically described.

Reverting to the hoist control shown diagrammatically in FIG. 2, all the control signals involved in regulating the speed of the motor under normal running conditions and in the control of the electric load brake having been described, the operation will be further explained.

As pointed out above, the speed reference signal representing the speed at which an operator desires the motor to run is developed by the induction master 22 as a function of the master handle position. This signal is fed to control windings 61 of the magnetic amplifier firing control identified generally by the reference numeral 24 and shown in detail in FIG. 4. The frequency detector 25 develops a signal which is a function of motor speed which is also fed to control windings on the magnetic amplifier unit, which acts to compare these two signals.

If the actual motor speed corresponds to the desired speed, as indicated by the position of the master handle, then no output from the magnetic amplifier unit results and similarly no current is furnished by the anode transformers 66 through either of the two silicon controlled rectifier units 26 and 27. Under this condition the saturable reactor and secondary resistance network 16 reduce the torque of the drive motor 15 to a minimum. Also no excitation current from the silicon controlled rectifier 27 flows to the electric load brake 17 and thus it develops no restraining torque.

Should the motor speed be less than that corresponding to the speed reference signal from the induction master 22, an unbalance in the magnetic amplifier control windings results, producing an output to the silicon controlled rectifier 26, which in turn produces excitation current to the saturable reactor, allowing increased motor current to flow, thus increasing the motor's torque and allowing it to accelerate.

If the speed of the drive motor 15 should exceed a value corresponding to the speed reference signal from induction master 22, the resulting unbalance in the control windings of the magnetic amplifier unit causes an output to the silicon controlled rectifier 27 in an amount depending upon the speed error, which in turn causes excitation current to flow to the electric load brake 17, in turn causing that element to produce retarding torque to decrease the motor speed.

When an unbalance in the magnetic amplifier unit causes an output from one of the silicon controlled rectifiers to the saturable reactor network 16 or the electric load brake, such unbalance tends to turn the other of such elements further off.

To further understand the operation, assume that all of the control windings 61 (see FIG. 4) on the magnetic amplifiers have the same number of turns, and that a bias current in one of these control windings to bias the magnetic amplifier to zero output is 2 milliamperes, with the odd numbered terminal negative; also that a change of one milliampere current is sufficient to turn the magnetic amplifier from "off" to "full on." Assume further that the frequency detector signal (terminals B1 and B2, with RB1 positive and MB1 negative) is 10 milliamperes with the drive motor stalled, decreasing linearly with increasing motor speed until it becomes zero at synchronous speed. The master signal would be adjusted to 10 milliamperes with the controller handle 21 in the full speed position, decreasing as the handle is moved toward neutral. Now if the master handle is set at a position calling for half speed, its control signal will be 5 milliamperes. If the motor reaches half speed, the frequency detector output will also be 5 milliamperes. The winding polarities are such that the two signals are additive in each magnetic amplifier. Since there is no speed error, neither amplifier should have any output and the bias control winding must carry sufficient signal to bias both amplifiers off.

In the R (saturable reactor) magnetic amplifier, this means the bias signal must be equal and opposite to the sum of the frequency detector signal and the master signal plus the 2 milliamperes to bias the magnetic amplifier off. Thus, there will be a total of 12 milliamperes in the bias winding, with terminal B3 negative. (When the odd numbered "B" terminals are negative with respect to the even numbered terminals the current in the winding tends to turn the output pulse off and the reverse is true when the odd numbered terminals are positive.)

The M (electric load brake) magnetic amplifier carries the same frequency detector and master signals since the control windings are in series but have opposite polarities. Thus, the bias current required here for zero output is $-10+-2=-12$ milliamperes in the turn-on direction (odd numbered terminals positive.)

Now if the motor is loaded and slows down, the output of the frequency detector increases. The signal change biases the M magnetic amplifier further off, but produces an output from the R magnetic amplifier which fires the silicon controlled rectifier 26, furnishing reactor excitation. The amount of excitation current depends on the amount of error. A 10% deviation (1 milliampere) is sufficient to cause maximum excitation to the saturable reactor and thus obtain maximum motor torque at any given speed.

Similarly, if the motor is subjected to an overhauling load and speeds up, the frequency detector signal decreases to less than 5 milliamperes. Now the R magnetic amplifier is biased off and the M magnetic amplifier biased on by an amount depending on the overspeed. Again a 10% deviation is sufficient to fully excite the electric load brake, allowing it to develop maximum torque for that speed. At the same time, motor driving torque is a minimum, since the saturable reactor is not excited.

It can be shown that the same response is obtained throughout the entire speed range of the master controller.

If it be assumed that the master is calling for half speed and the motor is running at half speed, then if the master handle should be suddenly moved toward the neutral position, the speed reference signal in the magnetic amplifier control windings would quickly decrease, while the frequency detector signal would remain the same. Under these conditions the reactor excitation would be cut off and the electric load brake would be fully excited to slow the motor. This produces a very effective slowdown when reduced speed is desired.

When the master handle is returned to neutral, both the master reference signal and the frequency detector signal go to zero and the motor is then de-energized so that no voltage or frequency is generated in the rotor. The bias signals alone control the magnetic amplifiers, and the bias is such that the saturable reactor excitation is off and the electric load brake excitation is at maximum, giving maximum slowdown effort of the electric load brake, which minimizes the motor brake wear and heating. If desired, the setting of the motor brake 19 can be delayed beyond its normal operating time so that the motor speed is reduced to a minimum before the brake sets. However, this is usually not required, since the electric load brake 17 normally provides sufficient torque to absorb the great majority of the energy.

The system of the invention has many fail-safe features. If the master signal fails, the drive runs at minimum speed with no chance of overspeeding. If the frequency detector signal fails, the absence of this signal is the same as though the drive were running at full speed, and the actual speed will be reduced to a minimum (except with master full on) because the combined master and bias signals will not allow saturable reactor current and will cause full electric load brake excitation, again resulting in a safe condition. In the event of loss of bias, the motor tends to run full speed at any master position off neutral because the R magnetic amplifier will turn on and the M amplifier will turn off. However, if the motor is driven by an overhauling load it will run as an induction generator at just over synchronous speed. The above conditions can be demonstrated by merely adding the control winding signals, as in the preceding example.

In considering the operation of the bridge and trolley (traverse) control, it should be noted that the induction master 22, the frequency detector 25, the bias supply circuit 32, the anti-hunt circuit 33 and the plugging control 30 are each connected to one of the equal control windings 61 of the R magnetic amplifier as shown in FIGS. 1 and 4 (disregarding the part of said figures enclosed in the dotted lines). The signals used for speed regulating purposes are the induction master 22, the frequency detector 25 and the bias supply 32.

The bias is set so that if the speed, as determined by the master setting and measured by the frequency detector, is less than desired, the silicon controlled rectifier unit 26 which receives the output of the R magnetic amplifier is caused to conduct by an amount depending on the degree of error. If the motor should be running too fast, no output from said magnetic amplifier is obtained and no excitation current flows to the saturable reactor. Thus the motor torque is reduced to a minimum and the drive slows down by coasting and, if it is desired to slow it rapidly, by plugging, there now being no electric load braking action to slow the drive, as is the case when the two control elements are used.

The upper part of FIG. 4 shows in detail the circuitry of the R magnetic amplifier firing circuit, the silicon controlled rectifier unit 26, anode transformer 66, and the saturable reactor control coil 56. The control elements are shown connected to the control windings 61, with terminals B1 through B12. The secondary current from the input transformer 58 is blocked by the high impedance of the load coils 60 when the magnetic amplifier core (not shown) remains unsaturated during the conducting half cycle (determined by the series diodes 62). In the design used here, suppose a control current in one winding of minus 2 milliamperes (odd numbered terminal negative) is required to maintain the core unsaturated during the conducting half cycle. Under this condition no output appears at terminals A4, A5, A6, and no current from the anode transformer 66 flows through the silicon controlled rectifier unit 26 to the control coil 56 of the saturable reactor. However, if a positive control current (odd terminal positive) is caused to flow in another control winding 61 of 1 milliampere (or the negative control current decreased to minus 1 milliampere in the other winding), the magnetic amplifier will saturate at the beginning of the conducting half cycle, producing an output pulse at terminals A4–A5 at the beginning of one half cycle and at A5–A6 at the next half cycle. This will cause the silicon controlled rectifier unit 26 to fire at the beginning of the conducting half cycle (proper phasing of voltages assumed) and maximum excitation current flows in the saturable reactor control coil 56. Thus by very small changes of the control signal values, the saturable reactor excitation can be turned on or off, or held at an intermediate value. The combination of the magnetic amplifier firing circuit and the silicon controlled rectifier unit forms a high gain D.C. power amplifier.

Now let us assume a master speed reference signal of 10 milliamperes corresponding to maximum (synchronous) speed applied to the control winding 61 connected to terminals B5 and B6 in a direction to increase excitation (B5 positive). The motor speed is numerically equal in percent to 100% of synchronous speed minus the slip of the rotor. Thus the motor speed can be represented by a constant signal minus the frequency detector signal. Since the magnetic amplifier control windings 61 are all equal, the motor speed signal must equal the master signal when the actual motor speed is equal to the desired speed. For example, if the master is set for synchronous speed and produces a 10 milliampere signal, an equal and opposite signal must be applied to the control windings if the motor actually runs at synchronous speed. Since under this condition the frequency detector output is zero, because rotor frequency is zero, it is now apparent that the constant signal mentioned above must also be 10 milliamperes. If the master were to call for zero speed, i.e., have a zero signal, and the motor were stalled, the constant 10 milliamperes plus the frequency detector signal must be zero. If the constant signal is 10 milliamperes, then the frequency detector output at stall must be minus 10 milliamperes. Algebraically, the relationship is as follows:

Reference signal—(Constant—frequency detector signal)=0

At maximum speed, 10—(10—0)=0
At half speed, 5—(10—5)=0
At zero speed, 0—(10—10)=0

The above relationship can be shown to hold for any speed. It should be noted that the signals are applied to control windings with polarities corresponding to the above algebraic signs; also that an additional minus 2 milliamperes bias is required to maintain the magnetic amplifier off, even when all other signals balance, so that the total bias becomes minus 12 milliamperes.

There is an inherent safety condition obtained in the use of the frequency detector in this manner. Due to the algebraic signs involved, both the master reference signal and the frequency detector signal are applied to the control windings with the same polarity. Loss of the frequency detector signal will act to cut off reactor excitation and slow the drive. On drives using a conventional tachometer speed feedback signal the opposite effect would result, with the motor going to full speed.

So far only the condition where desired motor speed is actually attained has been discussed. If the motor is loaded mechanically it will tend to slow down, increasing the frequency signal so that the above-described relationship is no longer satisfied and balance no longer exists in the control winding magnetomotive forces, the direction of the unbalance being such to cause excitation current to flow to the saturable reactor. An unbalance of 1 milliampere is sufficient to cause full excitation current and cause the motor to exert maximum torque to attain the desired speed.

Thus it can be seen that speeds very close to the desired value will be maintained under various loadings of the motor. A steady state condition will be reached whereby the speed error is just sufficient to cause enough output from the magnetic amplifier to fire the silicon controlled rectifier unit 26 to produce sufficient excitation of the saturable reactor load coil 56 to allow the motor to develop the torque required to drive the load at the desired speed.

Should the master be quickly returned from a high speed position to a low speed position, the sum of the master and the frequency detector signals is low, compared to the bias signal. This condition prevents output from the magnetic amplifier, so no saturable reactor excitation current flows and the motor torque is reduced to a minimum. The drive then slows down until the motor speed corresponds to the new master setting.

At this point the sum of the frequency detector signal and the master signal again equals the bias signal. Still no saturable reactor excitation current flows. However, if appreciable torque is required by the motor at the lower speed, the motor will continue to slow down, unbalancing the net control winding magnetomotive forces in a direction to cause excitation current to flow to the saturable reactor. Again the steady state condition is reached where the speed error is just sufficient to cause enough excitation current to allow the motor to develop the torque required by the load at the lower speed.

It will be apparent that various modifications and substitutions in the above-described illustrative embodiments of my invention may be made without departing from the principles of invention or the scope of the appended claims.

I claim:

1. Variable speed driving means for an electric motor control system comprising:
   an A.C. wound rotor motor;
   electrically energizable and controllable means for controlling the torque of said motor;
   electrically energizable and controllable braking means adapted to develop a torque opposing rotation of the motor;
   regulating means including means operable by the operator for providing an electric speed reference signal corresponding to the desired speed of the motor;
   speed detecting means for providing an electric signal which is a function of actual motor speed
      said regulating means also including amplifying means operable in response to a difference between the desired and actual motor speed, as represented by said signals, to control both of said electrically energizable and controllable means,
      said speed detecting means comprising a frequency detector connected to the secondary winding of said motor to produce an output signal proportional to the rotor frequency of said motor, and means providing a constant signal, such that the sum of said output signal and said constant signal is directly proportional to actual motor speed,
      said amplifying means having error detecting means,
      said error detecting means being responsive to said signals for establishing a current flow to one or the other of said controllable means or braking means which is proportional to the degree of error between the actual and desired motor speed to develop a torque in said motor when the speed of said motor is less than the desired speed as represented by the speed reference signal and to excite said braking means when the speed of said motor is greater than the desired speed and such that both said controllable means are not energized to any substantial degree simultaneously.

2. Variable speed driving means for an electric motor control system comprising:
   an A.C. motor including reversing means for reversing the direction of rotation of said motor;
   electrically energizable and controllable means for controlling the torque of said motor;
   electrically energizable and controllable braking means adapted to develop a torque opposing rotation of the motor;
   regulating means including means controllable by the operator for providing an electric speed reference signal corresponding to the desired speed of the motor;
   speed detecting means for providing an electric signal which is a function of actual motor speed;
      said regulating means also including amplifying means operable in response to a difference between the desired and the actual motor speed, as represented by said signals, to control both of said electrically energizable and controllable means,
      said amplifying means having error detecting means responsive to the desired reference signal and the signal of said speed detecting means for establishing a current flow in one or the other of said controllable means which is proportional to the degree of error between the actual and desired motor speed to develop a torque in said motor when the speed of said motor is less than the desired speed as represented by the speed reference signal and to excite said braking means when the speed of said motor is greater than the desired speed; and
   a plugging control operable by said speed detecting means for sensing the plugged condition of said motor and capable of causing constant excitation of said braking means and preventing excitation of said means for controlling motor torque during the entire plugging cycle.

3. Variable speed driving means for an electric motor control system comprising:
   an A.C. motor including reversing means for reversing the direction of rotation of said motor;
   electrically energizable and controllable means for controlling the torque of the motor;
   electrically energizable and controllable braking means adapted to develop the torque opposing the rotation of the motor;
   regulating means including means controllable by the operator for providing an electric speed reference signal corresponding to the desired speed of the motor;
   speed detecting means for providing a first electric signal which is a function of rotor frequency and a second electric signal which is a function of actual motor speed but which is limited to a predetermined value whenever motor rotation is opposite the direction of motor torque,
      said regulating means also including amplifying means operable in response to a difference between the desired and the actual motor speed as represented by said signals to the control both of said electrically energizable and controllable means,
      said amplifying means having error detecting means responsive to the reference signal and said second signal from said speed detecting means for establishing a current flow in one or the other of said controllable means which is proportional to the degree of error between the actual and desired motor speed to develop a torque in said motor when the speed of said motor is less than the desired speed as represented by the speed reference signal and to excite said braking means when the speed of said motor is greater than the desired speed; and a plugging control means to excite said braking means to develop a large torque opposing rotation of said motor during the plugging cycle comprising,     a switching means having an input connected to a power supply and an output connected to said amplifying means, and being triggered by said first electric signal,     said static switching means being changed from the nonconductive to the conductive state when said first electric signal attains a value equal to the stall condition in the rotor, whereby said static switching means applies power from said power supply to said amplifying means when in the conducting state to excite said braking means to develop a large constant torque opposing the rotation of said motor, and being changed from the conductive state to the nonconductive state at the end of the plugging cycle.

4. A variable speed driving means for an electric motor control system comprising:

an A.C. wound rotor motor;

electrically energizable and controllable means for controlling the torque of the motor;

regulating means including means controllable by the operator for providing an electric speed reference signal corresponding to the desired speed of the motor;

speed detecting means for providing an output signal which is a function of actual motor speed;

said regulating means also including amplifying means operable in response to a difference between the desired and the actual motor speed, as represented by the aforesaid signals, to control said electrically energizable and controllable means,     said speed detecting means comprising a frequency detector connected to the secondary winding of said motor to produce an output signal proportional to the rotor frequency of said motor, and means providing a constant signal such that the sum of said output signal and said constant signal is directly proportional to motor speed,     said amplifying means comprising an error detector which is responsive to the sum of said reference signal, said output signal, and said constant signal for establishing a current flow to the controllable means which is proportional to the degree of error between the actual and desired motor speed to develop a torque in said motor when the speed of said motor is less than the desired speed as represented by the speed reference signal, and to establish zero current flow to said controllable means to develop minimum motor torque when the speed of said motor is greater than the desired speed.

5. A variable speed driving means for an electric motor control system comprising:

an A.C. motor including reversible means for reversing the direction of rotation of said motor;

electrically energizable and controllable means for controlling the torque of the motor;

regulating means including means controllable by the operator for providing an electric speed reference signal corresponding to the desired speed of the motor when the direction of motor rotation and motor torque are the same and an electric torque reference signal corresponding to the desired degree of motor torque when the direction of motor rotation and motor torque are opposite;

means for providing a signal corresponding to motor torque;

speed detecting means for providing an electric signal which is a function of actual motor speed but which is limited to a predetermined value whenever motor rotation is opposite the direction of motor torque;

said regulating means also including amplifying means operable in response to a difference between the desired and actual motor speed and the difference between desired and actual motor torque, as represented by said signals, to control said electrically energizable and controllable means;

said amplifying means comprising error detecting means which is responsive to said signals for establishing a current flow to the controllable means when the direction of motor rotation and motor torque are the same which is proportional to the degree of error between the actual and desired motor speed to develop a torque in said motor when the speed in said motor is less than the desired speed as represented by the speed reference signal and to establish zero current flow to the controllable means to develop minimum motor torque when the speed of said motor is greater than the desired speed; and a plugging control operable by said speed detecting means and connected to said error detecting means for establishing a current flow to the controllable means which is proportional to the degree of error between the signal corresponding to the desired degree of motor torque and the signal corresponding to motor torque whenever the direction of motor rotation and motor torque are opposite.

6. A variable speed driving means for an electric motor control system comprising:

an A.C. motor including reversible means for reversing the direction of rotation of said motor;

electrically energizable and controllable means for controlling the torque of the motor;

regulating means including means controllable by the operator for providing an electric reference signal corresponding to the desired speed of the motor when the direction of motor rotation and motor torque are the same and corresponding to the desired degree of motor torque when the direction of motor rotation and motor torque are opposite;

means for providing a signal corresponding to motor torque;

speed detecting means for providing a first electric signal which is a function of rotor frequency and a second electric signal which is a function of actual motor speed but which is limited to a predetermined value whenever motor rotation is opposite the direction of motor torque;

said regulating means also including amplifying means operable in response to a difference between the desired and actual motor speed and the difference between desired and actual motor torque, as represented by said signals, to control said electrically energizable and controllable means;

said amplifying means comprising error detecting means which is responsive to said signals for establishing a current flow to the controllable means when the direction of motor rotation and motor torque are the same which is proportional to the degree of error between the actual and desired motor speed to develop a torque in said motor when the speed in said motor is less than the desired speed as represented by the speed reference signal and to establish zero current flow to the controllable means to develop minimum motor torque when the speed of said motor is greater than the desired speed; and a plugging control means to provide torque regulation of said A.C. motor during the plugging cycle comprising:

a static switching means having an input connected to said means for providing a signal corresponding to motor torque and an output connected to said amplifying means and being triggered by said first electric signal, said switching means being changed from the nonconductive to the conductive state when said first electric signal attains a value equal to the stall condition in the rotor whereby the switching means applies said signal corresponding to motor torque to said amplifying means to establish a current flow to the controllable means proportional to the degree of error between the signal corresponding to the desired degree of motor torque and the signal corresponding to motor torque for controlling the torque of said motor, and being changed from the conductive state to the nonconductive state at the end of the plugging cycle.

7. The apparatus according to claim 1 including means for reducing the excitation of the braking means to any desired value when the motor is not running, and means for delaying the action of said reducing means for a predetermined length of time to insure stoppage of the motor before actuation.

8. A variable speed driving means for an electric motor control system comprising:

an A.C. motor including reversible means for reversing the direction of rotation of said motor;

electrically energizable and controllable means for controlling the torque of the motor;

regulating means including means controllable by the operator for providing an electric speed reference signal corresponding to the desired speed of the motor when the direction of motor rotation and motor torque are the same and an electric torque signal when the direction of motor rotation and motor torque are opposite;

speed detecting means for providing an electric signal which is a function of actual motor speed but which is limited to a predetermined value whenever motor rotation is opposite the direction of motor torque;

said regulating means also including amplifying means operable in response to a difference between the desired and actual motor speed signals and the torque signal to control said electrically energizable and controllable means;

said amplifying means comprising error detecting means which is responsive to said signals for establishing a current flow to the controllable means when the direction of motor rotation and motor torque are the same which is proportional to the degree of error between the actual and desired motor speed to develop a torque in said motor when the speed in said motor is less than the desired speed as represented by the speed reference signal and to establish zero current flow to the controllable means to develop minimum motor torque when the speed of said motor is greater than the desired speed; and a plugging control operable by said speed detecting means and connected to said error detecting means for establishing a current flow to the controllable means which is proportional to the degree of actuation of said operator controllable means whenever the direction of motor rotation and motor torque are opposite thus allowing manual control of the motor torque during the plugging cycle to any desired value between a minimum and a maximum.

9. In combination with a reversing speed control system for A.C. motors including an electric braking means connected thereto and a means developing a signal proportional to rotor frequency, a plugging control system operable to detect a plugged condition in said motor as determined by said signal proportional to rotor frequency to apply a large excitation signal to said braking means to reduce the speed of said motor.

10. In combination with a reversing speed control system for A.C. motors including an electric braking means connected thereto, means developing a signal proportional to rotor frequency, and a bias means; a plugging control system including a static switch between said bias means and said electric braking means, said static switch being operable to connect said bias means to said electric braking means to supply a large excitation signal thereto to reduce the speed of said motor when said plugging control system detects a plugged condition in said motor as determined by said signal proportional to rotor frequency.

11. In combination with a reversing speed control system of an essentially stepless type for electric motors: means controllable by the operator providing a single variable reference signal, said signal serving as a speed reference signal corresponding to the desired speed of the motor when the direction of motor rotation and motor torque are the same and serving as a motor current reference signal corresponding to the desired motor current when the direction of motor rotation and motor torque are opposite; means for providing a feedback signal proportional to motor current; and a regulated plugging control system operable to detect a plugged condition of the motor and acting during the plugging cycle in response to any difference between said signals to regulate the motor current to cause it to closely correspond to said reference signal and, to the extent that motor torque is proportional to motor current, to permit said operator to control said motor torque during the plugging cycle to any desired value between a maximum and a minimum.

References Cited by the Examiner

UNITED STATES PATENTS

| | | | |
|---|---|---|---|
| 2,962,646 | 11/1960 | Pell | 318—258 |
| 3,029,372 | 4/1962 | Vogt | 318—302 X |
| 3,090,901 | 5/1963 | Shaw | 318—302 X |

FOREIGN PATENTS 847,665  9/1960  Great Britain.

ORIS L. RADER, *Primary Examiner.*

D. F. DUGGAN, S. GORDON, *Assistant Examiners.*